Dec. 15, 1931.    N. L. BIGTON ET AL    1,836,006
MACHINE FOR MOLDING PLASTIC MATERIAL
Filed Nov. 17, 1927    3 Sheets-Sheet 1
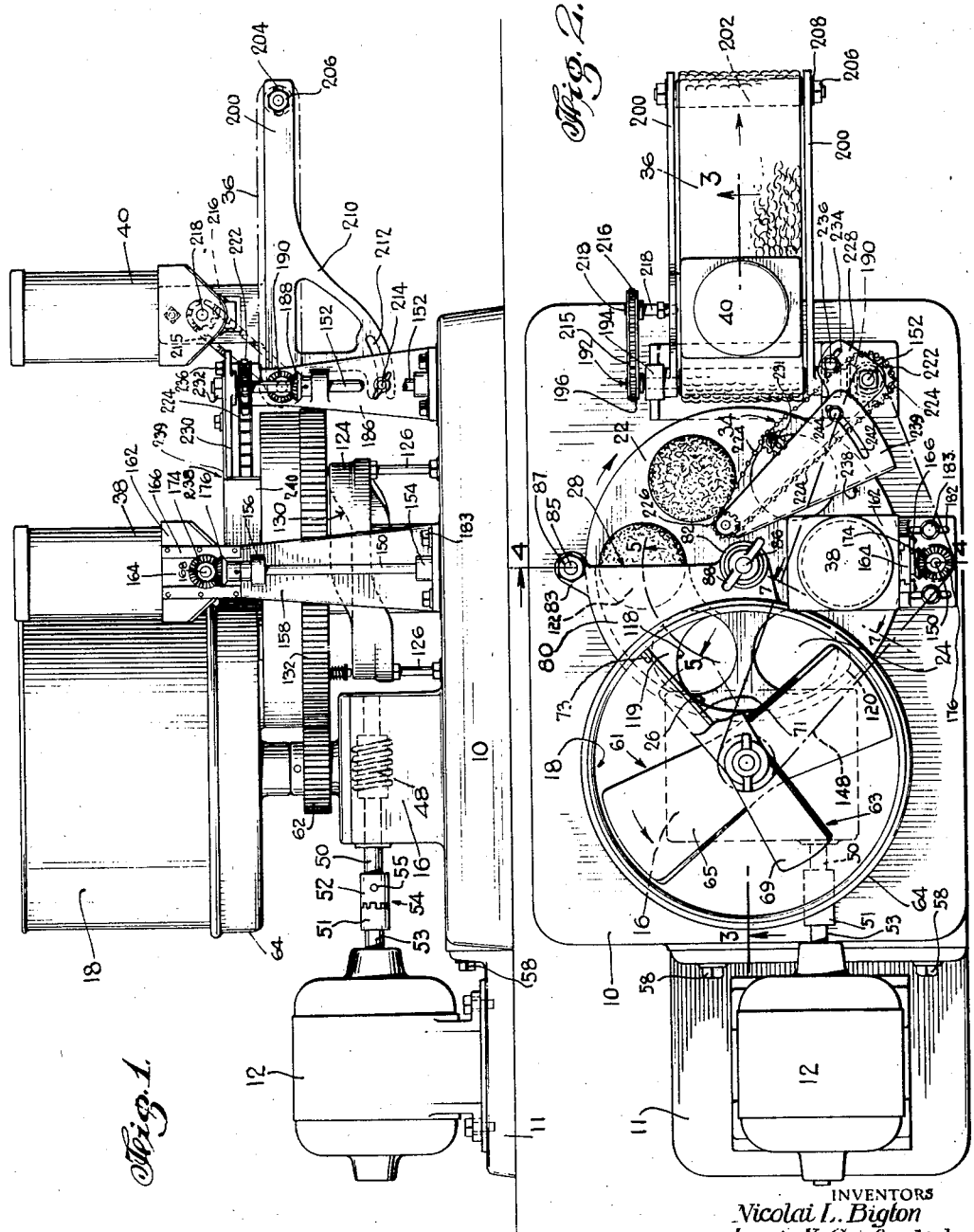
INVENTORS
Nicolai L. Bigton
Louis X. Garfunkel
BY
ATTORNEY

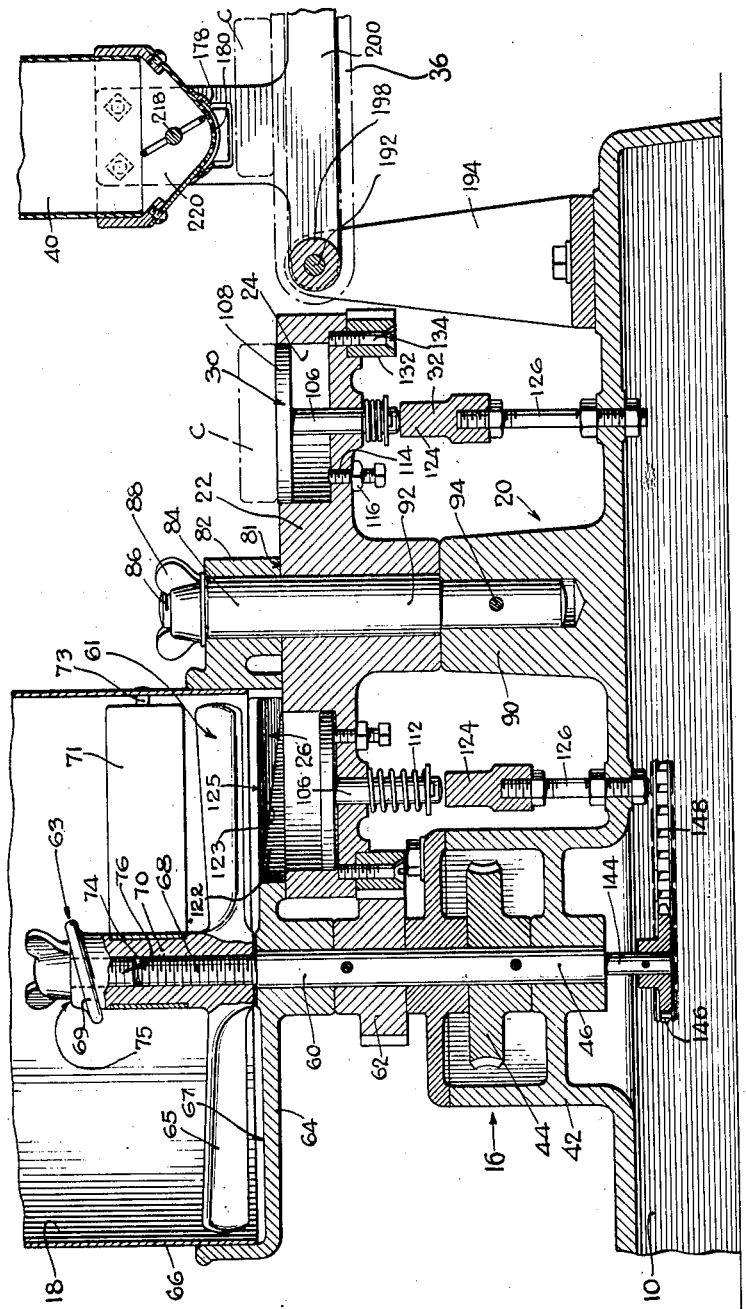

Dec. 15, 1931.                    N. L. BIGTON ET AL                    1,836,006
                          MACHINE FOR MOLDING PLASTIC MATERIAL
                          Filed Nov. 17, 1927        3 Sheets-Sheet 3
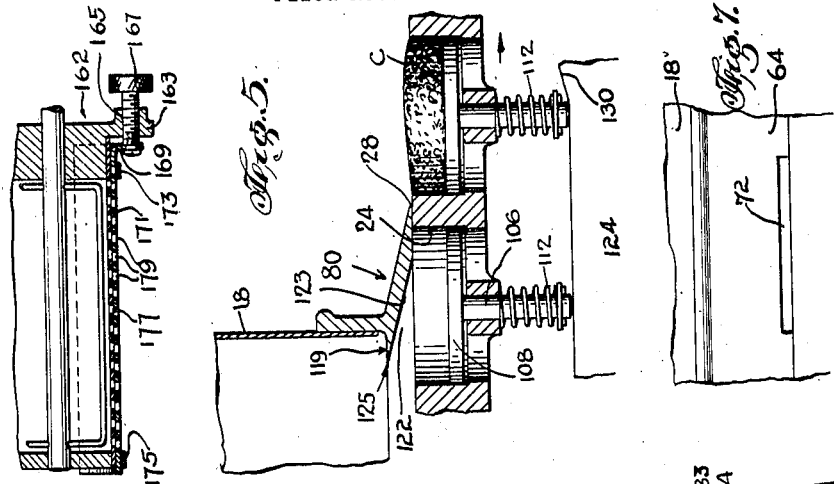
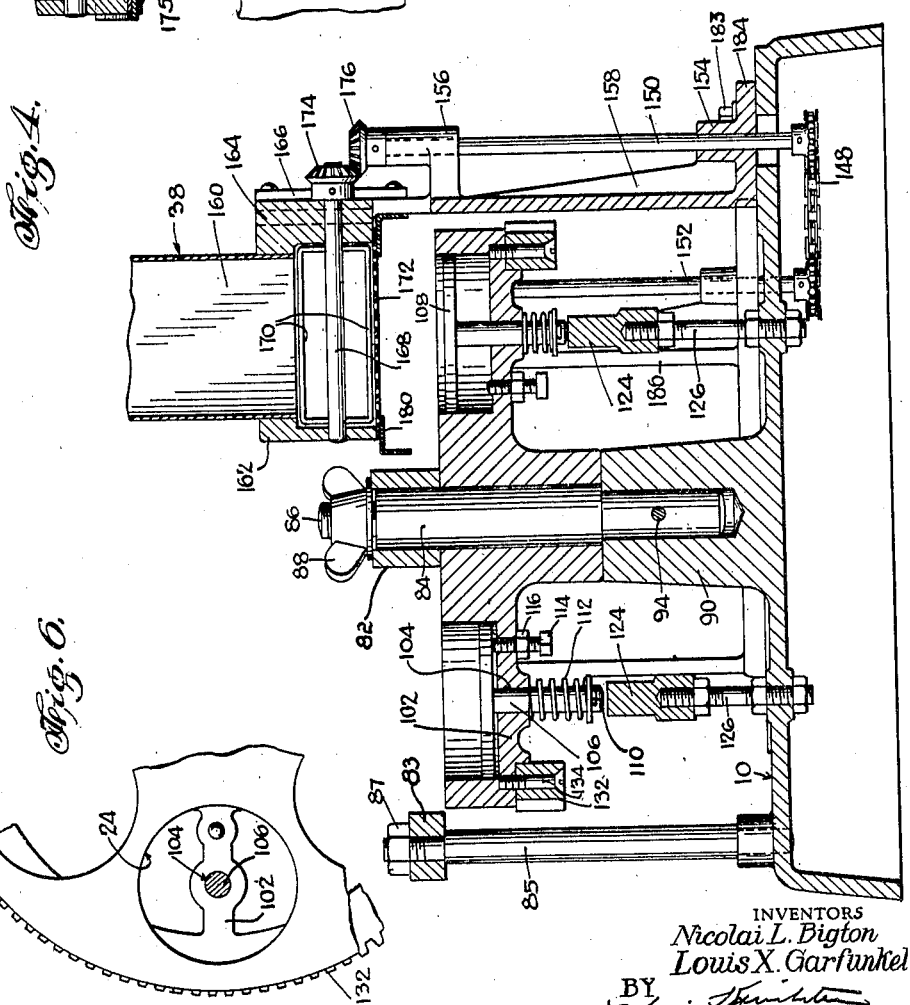
INVENTORS
*Nicolai L. Bigton*
*Louis X. Garfunkel*
BY
    ATTORNEY Patented Dec. 15, 1931

1,836,006

UNITED STATES PATENT OFFICE

NICOLAI LEWIS BIGTON, OF CAMDEN, NEW JERSEY, AND LOUIS X. GARFUNKEL, OF NEW YORK, N. Y., ASSIGNORS TO AUTOMATIC HAMBURGER MACHINE COMPANY, INC., A CORPORATION OF NEW YORK

MACHINE FOR MOLDING PLASTIC MATERIAL

Application filed November 17, 1927. Serial No. 233,930.

This invention relates to machines for molding plastic material. More particularly, the invention is directed to a device for forming comminuted meat material, prepared for the making of meat balls, hamburger steaks, and the like, or other plastic or easily shaped materials, into the customary cakes.

One object of this invention is to provide a machine of the character described, compactly assembled, mounted for easy removal of the several parts for repairs, cleaning, substitution or replacement, or the like, and which shall be of sturdy construction.

A further object of the invention is to provide a machine of the character described in which all the parts for preparing the cakes are mounted upon a single base, and in which the direction of the movement of the material is in a straight line from the point of its admission to the machine to the point of discharge therefrom.

Another object of the invention is to provide a machine of the character described, which, in addition to forming the cake, also applies in effective and efficient manner a coating of cracker crumbs or a similar dusting material to surfaces of the cake.

A still further object of this invention is to provide a machine of the character described, whereby cakes of different sizes may be made, having means for applying the coating above described, said means being arranged so that cakes of different sizes may be properly coated.

An additional object is to provide in the hopper feed of a machine of the character described, means for positively feeding the plastic material contained in said hopper to a cake-forming means made a part of said machine.

A further object is to provide in a machine of the character described in conjunction with the forming means, a positive means for removing finished cakes from the forming means without deforming the cake.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a machine embodying the invention.

Fig. 2 is a plan view of the machine shown in Fig. 1.

Fig. 3 is a vertical sectional view on line 3—3 of Fig. 2 of the hopper, forming plate, and discharge conveyor.

Fig. 4 is a vertical sectional view on line 4—4 of Fig. 2, showing the forming plate and its associated cracker crumb feed box.

Fig. 5 is a sectional view taken along the arcuate line 5—5 of Fig. 2, showing the relation of the elements in the forming plate with parts of said hopper.

Fig. 6 is a partial plan view of a portion of the forming plate, the piston plate being removed to show features of the invention.

Fig. 7 is an elevational view of a detail of the hopper and the forming plate.

Fig. 8 is a vertical sectional view of a modified form of cracker crumb spreading means.

The machine embodying the invention shown on the drawings comprises a base 10 having the bracket support 11 mounted at one end thereof to carry the power device 12. Said power device has coupled connection with the drive device 16. Mounted on said drive device and connected thereto in a manner hereinafter described is the hopper 18.

A fixed support 20 on said base 10 carries the forming plate 22 rotatably associated therewith, said plate having a number of mold openings 24, which are movable into position under the discharge opening 26 of hopper 18. Said mold openings 24, in moving away from said hopper, pass under the scraper edge 28, the latter removing any excess of material above the upper surface of forming plate 22. Ejecting means 30, mounted in openings 24, are actuated by a cam device 32 to eject the formed cake C from said mold openings on to the top of plate 22, where it will come into contact with the cake removing device 34. The latter device moves the cake so that it will slide off plate 22 upon a chain belt 36, which conveys the cake to a storage container or the like, or, if desired, may deposit it within a suitable cooking device (not shown). Positioned over plate 22 is the cracker crumb spreader 38, which is so related to hopper 18 that a coating of crumbs will be applied to said plate before it moves under the discharge opening 26. Likewise, a cracker crumb spreader 40 is supported over belt 36 to continuously discharge cracker crumbs thereon so that any material passing over belt 36 will be properly coated.

The drive device 16 consists of a casing 42, in which is mounted the worm gear 44 fixed to the shaft 46, which extends vertically from said casing at both ends thereof. The worm 48 which engages the worm gear 44 is fixed to shaft 50, extending horizontally out of casing 42 and having one section 52 of the coupling 54 carried at the end thereof. The other section 51 of said coupling is carried on the shaft portion 53 of the power device 12, a shear pin 55 being made a part of said coupling to safeguard against excessive overloads on said power device, which may be an ordinary electric motor.

In order to fix the vertical position of shaft end 53 with respect to shaft 50, for properly connecting the sections 51, 52 of coupling 54, the bracket 11 is adjustably mounted at one side of base 10, the cap screws 58, extending from base 10, and slots (not shown) in the side of bracket 11 providing adjusting and securing means for this purpose.

Fixed on the upwardly extending portion 60 of shaft 46 and resting on casing 42 is the gear 62, the base plate 64 of hopper 18 being supported on said gear and being retained against rotary movement in the manner hereinafter described. The body 66 of hopper 18 is suitably mounted in the base plate 64 in any well known manner, as by being pressed thereinto.

The extreme end of shaft 46 is formed with the threads 68, as shown in Fig. 3, the internally threaded body portion 70 being received on said threads. Said body portion carries a feeding member 61 and the agitator 63, preferably formed integral therewith. The feeding member 61 consists of the angularly biased, extending blades 65, located in proximity to the upper surface 67 of base plate 64. The agitator 63 comprises the blades 69, extending from body portion 70 substantially in a plane at right angles, and having an angular bias similar to that of blades 65, said blades 69 being spaced vertically from the plane of blades 65. Mounted on the body portion 70 intermediate feeding member 61 and agitator 63 is the stop blade 71, freely rotatable on said body portion and in hopper 18, but restrained against moving past a position hereinafter specifically described, by the projection 73 on body 66 of hopper 18.

The threads 68 are cut in a direction such that, as the shaft 46 rotates and blades 65 and 69 act upon the material contained in hopper 18, the body portion 70 will tend to become more tightly secured upon the shaft 46.

The threads in body portion 70 extend the entire length of the internal passage 74. At the end 75, an adjusting stop 76 is secured by threading. When body portion 70 is threaded down over shaft 46, the end of stop 76 within passage 74 is adapted to contact with the end of shaft 46. By this last described means, the effective distance between the upper surface 67 of base plate 64 and blades 65 of feeding member 61 may be controlled in order to control the feed pressure of material forced from hopper 18. By this means, it is possible to form very thin cakes of plastic material since the feeding member 61 may be regulated to apply a very high or a low pressure to material discharging from opening 26, such regulation being made by the operator in accordance with the plasticity, temperature, and texture of the material to be handled and with the thickness of the cake to be formed. The biased blades of agitator 63 tend to prevent the formation of pockets in the material placed in hopper 18. The blade 71 tends to stop the movement of the entire mass of material contained in hopper 18, a condition which takes place in a mass of viscous, sticky material. In such cases, the feeding member 61 and agitator 63 would tend to pick up the entire mass and rotate it around shaft 46. Blade 71, stopped by projection 73 will restrain any such movement of the plastic mass. Blade 71 has been found to be most effective when positioned so that it is practically tangent with that edge of opening 26 by which the mold openings 24 pass last in their movement past hopper 18. The material being forced around by feeding member 61 is crowded against blade 71 and assists the blades 65 of feeding member 61 in becoming effective to compress the material into the openings 24 just as they move out of the effective range of hopper 18.

Fixed support 20 comprises the boss 90, preferably made integral with base 10, and having fixedly mounted therein the spur shaft 92 secured against rotary movement by the pin 94. Rotatably received on said shaft 92 and supported on boss 90 is the forming plate 22. Base plate 64 is provided with an arcuate projection 80, preferably formed integral with said plate, the outer edge of said projection defining the scraper edge 28. At one end of said projection is the socket 82, adapted, when base plate 64 is positioned on shaft 46, to be received over the end 84 of spur shaft 92, which extends above forming plate 22 to terminate in the reduced threaded portion 86. Said threaded portion 86 receives the wing nut 88 for retaining plate 22 against vertical movement. The pressure contact of the lower face 81 of projection 80 upon the plate 22 may be regulated by wing nut 88.

The other end of projection 80 extends beyond the periphery of plate 22, and terminates in an ear 83 having an opening therethrough for reception upon a vertical support 85 carried on base 10. A nut 87 threaded on the end of said support assists the wing nut 88 in the regulation of the pressure contact between projection 80 and plate 22. By regulating this pressure contact, passage of material from hopper 18 out on plate 22 other than through the openings 24, may be prevented.

Plate 22 is preferably circular in shape and has formed therethrough a number of the openings 24 positioned so that their centers are preferably evenly spaced on a circle concentric with said plate. Across each of these openings extends the rib 102 having an opening 104 in the middle thereof to receive the pusher-rod 106 of a piston 108. A pin 110 extending through rod 106 retains a spring 112 on said rod, said spring contacting the under surface of rib 102. A set screw 114 threaded through rib 102 and adapted to be maintained in a fixed position by a lock nut 116, provides an adjustable stop for the piston 108.

Projection 80 has an arcuate passage 122 formed therein, the arc of said passage being concentric with plate 22. Said passage opens at the hopper end into discharge opening 26, which extends from the point 120, at which openings 24 pass under hopper 18, to a position 118 just short of the exit of said openings therefrom, this position being defined by portion 119 of base plate 64 covering the end of passage 122. At point 120, a portion of the vertical wall of the body portion of base plate 64 is cut away to provide the opening 72. Said opening, for a purpose hereinafter to appear, is of a width considerably greater than that of any opening 24 in plate 22.

The ceiling 123 of passage 122, as seen from Figs. 3 and 5, slopes downwardly from the fine edge 125 at position 118 to the scraper edge 28. It will thus be seen that, as opening 24 moves under the base plate 64 and into registry with opening 26, material from hopper 18 will drop, or be forced by the feeding member 61, thereinto. Then, as the opening 24 moves past the edge 125, excess material is cut off, the inclined ceiling 123 further removing such material gradually, at the same time compressing the material retained in the mold opening. Edge 28 cleans off plate 22 and evens off the top of cake C in the mold opening 24.

Mounted concentrically with the fixed support 20 on base 10 is the cam 124 of cam device 32 held in fixed position by the threaded rods 126, secured to base 10 in any suitable manner. The lower end of rod 106 of ejecting means 30 is adapted to ride on cam 124, and to come into contact with the rising surface 130 just as the opening 24 has completely passed from the scraper edge 28, as seen in Fig. 5. The cake formed in said mold opening 24 is then pushed upwardly by the piston 108 until the entire cake is on the top surface of plate 22. Preferably the extreme rise of surface 130 is sufficient to raise the upper surface of piston 108 slightly above the plane of plate 22. It has been found that, by this construction, the separation of the cake from the mold is complete and the removal of said cake, in the manner hereinafter described, facilitated.

Plate 22 has affixed at its outer periphery the annular gear 132, secured to the plate 22 by means of the cap screws 134. Said gear meshes with the gear 62 fixed on shaft 46. By this means, positive drive of said plate is assured. It is to be understood that the gearing of plate 22 to shaft 46 is such that the feeding member 61 will make one complete revolution for each two openings 24 passing opening 26. Also the blades 65 of feeding member 61 are so timed that the upper edge of the blade is just passing one edge of opening 26 as an edge of opening 24 moves into cooperative relation with opening 26, while the lower edge of the blade and an edge of opening 26 will simultaneously pass edge 125.

Downwardly extending portion 144 of shaft 46 is provided with a sprocket 146, upon which is carried the chain belt 148. Said belt 148 is carried from shaft 46 over shaft 150 and around shaft 152 in order to drive devices connected mechanically with said shafts.

Shaft 150 is supported in the bearings 154, 156, made a part of the bracket 158, which also provides a supporting means for cracker crumb spreader 38. Said spreader comprises a container 160 mounted in a hopper end 162, which is provided with the slide 164 to cooperate with the guides 166 on said bracket, whereby the spreader may readily be removed from said bracket. Mounted in said hopper end is the shaft 168 on which is secured the agitator member 170 cooperating with the foraminated plate 172 by means of which cracker crumbs or the like in container 160 will be thrown out through the perforations of plate 172 upon the plate 22. Shaft 168 extends beyond said hopper end and between said guides, and has secured to its external portion the bevel gear 174, adapted to mesh with the bevel gear 176 fixed to the upper end of shaft 150. It will thus be seen that spreader 38 may readily be removed from bracket 158 to substitute spreaders with different sized outlets, or having containers of various capacities, conforming to mold openings 24 of various sizes.

If desired, this variation in the size of the discharge opening may be accomplished, as shown in Figs. 3 and 4, by providing at the lower extremity of the hopper end 162, a guide 178 for slidably receiving imperforate plates 180 in close contact with the foraminated plate 172. By moving these plates with respect to each other in guide 178, a variation in the effective discharge opening in hopper end 162 is produced by shutting off any desired number of perforations in plate 172.

In Fig. 8 is shown a modified means for controlling the feed from hopper end 162. In this construction a depending ear 163 is formed integral with hopper end 162, receiving in a threaded opening 165 therethrough, the adjusting screw 167. Swivelled on the inwardly extending end of said screw is the depending lug 169 at one end of a plate 171 supported in guides 173, 175 to be slidable parallel to the fixed foraminated plate 177. Plate 171 has openings 179 formed therethrough, presenting a pattern substantially identical with that of plate 177. It will be readily seen that by rotating screw 167, plate 171 will be fed relative to plate 177, decreasing or increasing the effective area of the discharge openings in plate 171.

Adjusting means 182 is provided in the foot 184 of bracket 158 by means of which the spreader 38 may be moved in or out in relation to plate 22; or, by removing one of the nuts 183 of said adjusting means, the bracket 158 and the parts carried thereby may be swung away from plate 22 whenever it is desired to clean said plate or remove it from support 20. If both nuts 183 be removed, bracket 158 and the parts supported thereon may be entirely removed from base 10.

Shaft 152 is supported in bracket 186 in a manner similar to shaft 150. A bevel gear 188 at the upper portion of said shaft meshes with a complementary gear 190 carried on one end of horizontal shaft 192, the latter being supported in the upright bearings 194, which may be made integral with bracket 186, and having sprocket 196 secured at the other end thereof. Shaft 192, between the bearings 194, carries the composite sprocket 198, which provides the drive means for the chain belt 36.

Two cantilever arms 200 are mounted on shaft 192 between bearings 194 and carry at their outer ends the roller 202 adjustably supported in said arms by means of the slot 204 and lock nuts and washers 206, 208. An arcuately formed portion 210 on each of said arms 200 is provided with an arcuate slot 212 to receive the pin 214 extending between the bearings 194 by means of which the angularity of chain belt 36 with respect to plate 22 may be controlled.

Sprocket 196 at the end of shaft 192 is connected by a chain belt 215 or the like with the sprocket 216 on the end of shaft 218 extending into the hopper end 220 of cracker crumb spreader 40. Said spreader may be removably mounted in a manner similar to that used for cracker crumb spreader 38 or may have applied thereto the variable discharge openings previously described.

Belt 36 is foraminous, due to its chain construction, and any excess of cracker crumbs will fall through the belt upon any support on which the base 10 may rest or into any suitable receiving retainer (not shown) positioned below belt 36. It is, of course, apparent that as cake C moves through the curtain of cracker crumbs falling from spreader 40, crumbs will attach themselves not only to the top surface but, due to the adhesive nature of the material of the cake, to the edges thereof also.

On the extreme end of shaft 152 is secured the sprocket 222 driving the belt or chain 224 supported so as to present a moving vertical surface and extending over plate 22 to be received upon the sprocket 226, adjustably supported in the inwardly extending cantilever bracket 228. This bracket consists of a plate 230 mounted on shaft 152, supported on sprocket 222 and retained against vertical movement on said shaft by means of the lock nut 232. Said bracket 228 is adjustable to bring the plane of belt or chain 224 into various relations with the openings 24 in plate 22 by means of the slot 234 and the associated pin and lock nut 236, the latter being secured to a fixed portion of the bracket 186 for retaining said bracket against rotary movement.

An idler sprocket 231 is adjustably supported on plate 230 and is movable to give belt 224 an angular bias in order to properly guide a formed cake C off plate 22. The scraper 238 comprises a plate 239 pivoted about the extending end of the spur shaft of gear 226 and having a downwardly extending edge 240 contacting with the upper surface of plate 22, the angularity of said edge with relation to the plane of chain 224 being adjustable by means of the slot 242 and the pin and lock nut 244, said pin being secured to plate 230. If desired, downwardly extending edge 240 may be embodied in a piece separate from plate 239 and hinged thereto, a spring means being provided to retain said edge in contact with plate 22.

In operation, the body 66 of hopper 18 is filled with a comminuted, or plastic, or similar material, after which power is applied to the power device 12. The feeding member 61 will now become operative to force said material through opening 26 down the passage 122 and on to the top of plate 22. Plate 22, rotated by the drive device 16, gear 62 and annular gear 132, moves the mold openings 24 into communication with passage 122, material passing to mold openings 24 under the control of feeding member 61. As the openings move past the scraper edge 28 the upper surface of the cake in said mold opening will be determined so that the cam device 32 may positively eject a completed cake by means of the piston 108. During this time, the spreader 38 has been continuously active to coat the upper surface of the plate 22 with cracker crumbs or the like, so that the top surface of piston 108 before admission to hopper 18, was prepared to apply a proper coating of cracker crumbs to the material forced into mold opening 24.

Cam 32 is so formed that pistons 108 will fall before the mold openings pass the opening 72 in hopper bottom 64, in order that cracker crumbs, discharged from spreader 38, may be retained on the upper surface of the piston 108. Also the top surface of plate 22 around the openings 24 is coated with crumbs, the latter entering the hopper to be mixed with the material contained therein. This is a valuable aid to reducing the stickiness of the mass, especially in the case of ground meat for the making of hamburger steak. The cake C, ejected by piston 108, is now carried by plate 22 into contact with the continuously moving belt 224. Said belt slides the cake off the plate and on to the belt 36, which conveys it away to any suitable point. As the cake moves over said last named belt, the cracker-crumb spreader 40 discharges a coating of cracker crumbs over the upper surface, and also around the edges of said cake. Excess crumbs fall through said belt and into any suitable receptacle which may be provided. On the plate 22, the scraper 238 is active to clean the top of plate 22, and prevent any meat or cracker crumbs or the like from passing beyond its edge.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. A cake forming machine for plastic material comprising a feed hopper, an automatic molding and cake discharging means associated with said hopper, a pair of separate rotatable dusters for applying powdered material to the formed cakes, one applying powdered material on one side and the other to the other side of each cake formed, a movable member mounted to remove the discharged cakes from the molding plate and means for simultaneously and continuously operating said automatic means, said dusters, and said removing member.

2. A cake forming machine for comminuted, compressible material comprising a feed hopper, an automatic molding and cake discharging means associated with said hopper, means mounted relative to said automatic means for supplying a coating of powdered material for one side of said cake, an apertured belt conveyor mounted to receive the discharged cakes, and means mounted above said conveyor to apply a coating of said powdered material to the other side of said cake whereby excess of said powdered material may fall thru the apertures in said conveyer.

3. A molding machine comprising, in combination, a base, driving means mounted thereon and having a shaft extending therefrom, a hopper having an outlet received on said shaft, means on said shaft for progressively carrying material in the hopper to said outlet, a molding plate, a shaft parallel to and spaced from said first shaft rotatably mounting said molding plate in overlapping relation with respect to said hopper, and means on said first shaft for rotating said plate.

4. In combination, a base, a drive device mounted thereon including a rotatable shaft extending therefrom, a hopper centrally received on said shaft and a gear fixed to said shaft interposed between said drive device and said hopper, and a molding plate operatively connected to said gear.

5. In combination, a base, a drive device mounted thereon and having a shaft extending therefrom, a gear fixed to said shaft and resting on said drive device, a hopper received on said shaft and resting on said gear, and a cake forming plate operatively associated with said hopper and having drive engagement with said gear.

6. In combination, a base, a drive device mounted thereon and having a shaft extending therefrom, a gear fixed to said shaft and resting on said drive device, a hopper received on said shaft and resting on said gear, a support spaced from said shaft extending from said base, and a cake forming plate mounted thereon and being operatively associated with said hopper, said support operatively engaging said hopper to prevent rotation thereof, said plate having drive engagement with said gear.

7. A forming machine for comminuted compressible material comprising driving means including a rotatable shaft, a fixed hopper mounted on said shaft having a discharge opening, a molding plate mounted on a fixed shaft spaced from said first mentioned shaft to extend under said opening, means associated with said plate to form cakes, ejecting means associated with said forming means, and a conveyor positioned relative to said plate to remove said formed cakes, the effective centers of said shafts and conveyor being arranged along a straight line.

8. A hopper feed for a comminuted compressible material forming-machine comprising a container having an open bottom, a closure for said bottom having an eccentric opening therethrough, an extension formed on said closure, said extension having an elongated gradually sloping undercut portion at the end of said extension.

9. A device for shaping plastic, compressible material comprising a material feeding section, a material shaping section, and a finished material delivery section, means to apply a coating to the under surface of said finished material, and separate means to apply a coating to the remaining surface of said finished material, said coating applying means being operatively connected to said material shaping section for continuous and simultaneous movement therewith.

10. In a forming machine for meat cakes and the like, a base, a hopper removably mounted on said base and having a discharge outlet, a continuously rotatable cake shaping device mounted to move past said outlet, and means operatively connected to said device for simultaneous continuous operation therewith mounted to apply a coating to said device before the latter moves past said outlet.

11. In combination, a hopper for receiving plastic material having a discharge opening, a feeding member rotatable past said opening, and a stationary stop blade mounted within said hopper above said feeding member and adjacent said opening whereby rotation of said material within said hopper is retarded.

12. In a cake forming machine of the character described, in combination, a stationary hopper provided with a bottom wall having an opening therein, a rotatable plate having molds therein arranged to pass beneath said opening, said bottom wall having a cut-away portion in the under surface thereof adjacent said opening, said cut-away portion being in the form of an arc of a circle overlying the circular path of said molds, whereby cake forming material within said hopper may be guided into said molds.

13. In combination, a base, drive means on said base including a rotatable shaft extending upwardly therefrom, a hopper having an eccentric opening therein received on said shaft, a support on said base spaced from said shaft, and a molding plate removably carried by said support and operatively connected to said shaft for continuous rotation therewith, portions of said plate and hopper overlapping each other.

14. In combination, a base, drive means provided thereon including a rotatable shaft extending upwardly therefrom, a hopper received on the upper end of said shaft, said hopper having an outlet, means mounted on said shaft for progressively feeding material in said hopper to said outlet, a molding plate operatively mounted in spaced relation to said shaft, and means on said shaft for continuously driving said plate.

15. A cake forming machine for plastic material comprising a feed hopper provided with a bottom wall having an opening therein, rotary means for feeding said material thru said bottom wall, means mounted on said rotary means for agitating said material to prevent formation of pockets therein, and stop means within said hopper for retarding rotation of said material relative to said hopper.

16. A cake forming machine for plastic material comprising a feed hopper provided with a bottom wall having an opening therein, rotary means for feeding said material thru said bottom wall, means mounted on said rotary means for agitating said material to prevent formation of pockets therein, and stop means within said hopper for retarding rotation of said material relative to said hopper, said bottom wall being formed with a cut-out portion having the shape of an arc of a circle in the under surface thereof adjacent said opening.

17. A cake forming machine for plastic material comprising a feed hopper provided with a bottom wall having an opening therein, rotary means for feeding said material thru said bottom wall, means mounted on said rotary means for agitating said material to prevent formation of pockets therein, and stop means within said hopper for retarding rotation of said material relative to said hopper, said bottom wall being formed with a cut-out portion having the shape of an arc of a circle in the under surface thereof adjacent said opening, said bottom wall being extended beyond said hopper, said cut-out portion terminating at the edge portion of said extension.

18. In combination, a base, drive means provided thereon including a rotatable shaft extending therefrom, a hopper received on said shaft, means for fixing said shaft against longitudinal movement, said hopper having an outlet in the bottom wall thereof, means mounted on said shaft for progressively feeding material in said hopper to said outlet, and means for adjusting the height of the feeding means relative to said opening to regulate the pressure on the material fed thru said opening.

19. In combination, a base, drive means provided thereon including a rotatable shaft extending therefrom, a hopper received on said shaft, means for fixing said shaft against longitudinal movement, said hopper having an outlet in the bottom wall thereof, means including an internally threaded member mounted on said shaft for progressively feeding material in said hopper to said outlet, and means coacting with said internally threaded member and said shaft for adjusting the height of said feeding means relative to said opening to regulate the pressure on the material fed thru said opening.

20. In combination, a rotatable shaft, means for fixing said shaft against longitudinal movement, a stationary hopper having a bottom wall received on said shaft, said shaft having a threaded portion extending into said hopper, said wall having an opening therein, and means for progressively feeding material in said hopper thru said openings, said means comprising a member having an internally threaded portion engaging the threaded portion of said shaft, and inclined vanes extending from said portion, the direction of the incline of said vanes and the direction of said engaging threads being such that said feeding means will tend to move on said shaft toward said bottom wall during the feeding operation.

21. A cake forming machine comprising a shaft, a hopper mounted thereon, a forming and discharging plate, a second shaft parallel to said first shaft and spaced therefrom for mounting said plate, a discharging belt conveyor, and a single drive means for said several parts, said hopper shaft, plate shaft and conveyor being arranged in alignment.

22. In combination with a compressible material, continuously rotatable cake forming mechanism, and a pair of separate dusters operatively connected to said cake forming mechanism for continuous rotation therewith, one of said dusters being adapted to apply powdered material on one side, and the other duster being adapted to apply powdered material to the other side of each cake formed.

23. The combination with a base, drive means mounted on said base, said means comprising a vertical shaft journaled on said base for rotation, of a hopper mounted on said shaft and removable therefrom, a molding plate mounted on said base and having communication with said hopper, and means for moving said plate, said last named means comprising a gear mounted on said shaft beneath said hopper and supporting the latter, and a gear on said plate meshing with said first gear.

In testimony whereof we affix our signatures.

NICOLAI LEWIS BIGTON.
LOUIS X. GARFUNKEL.